(12) United States Patent
McMahan et al.

(10) Patent No.: US 6,705,674 B1
(45) Date of Patent: Mar. 16, 2004

(54) SEAT FOR TWO- OR THREE-WHEELED VEHICLE

(76) Inventors: Jeffrey A. McMahan, 1917 Beckert Dr., Piqua, OH (US) 45356; Robert M. McMahan, 8301 Port Haven Dr., Sidney, OH (US) 45365

( * ) Notice: Subject to any disclaimer, the term of this patent is extended or adjusted under 35 U.S.C. 154(b) by 0 days.

(21) Appl. No.: 10/236,851

(22) Filed: Sep. 6, 2002

(51) Int. Cl.$^7$ ................................................. B62J 1/00
(52) U.S. Cl. ............................... 297/195.1; 297/215.15
(58) Field of Search ......................... 297/195.1, 195.11, 297/197, 215.13, 215.14, 215.15

(56) References Cited

U.S. PATENT DOCUMENTS

| | | | |
|---|---|---|---|
| ,337,171 A | 3/1886 | Lillibridge | |
| ,435,385 A | 9/1890 | Babbitt | |
| ,471,417 A | 3/1892 | Bunker | |
| ,484,367 A | 10/1892 | Hicks | |
| ,499,244 A | 6/1893 | Naly et al. | |
| 544,625 A | * 8/1895 | Montague | ................. 297/195.1 |
| ,576,310 A | 2/1897 | Henderson | |
| ,619,179 A | 2/1899 | Hunt | |
| ,638,519 A | 12/1899 | Meisselbach et al. | |
| ,654,720 A | 7/1900 | Englebert | |
| 1,157,512 A | 10/1915 | Deem | |
| 2,188,153 A | 1/1940 | Mesinger | |
| 3,249,384 A | 5/1966 | Timms | |
| 3,874,730 A | 4/1975 | Marchello | |
| 4,176,880 A | 12/1979 | Marchello | |
| 4,429,915 A | * 2/1984 | Flager | ......................... 297/199 |
| 4,773,705 A | 9/1988 | Terranova | |
| 4,850,643 A | 7/1989 | Rollman | |
| 5,568,958 A | * 10/1996 | Chen | ..................... 297/215.15 |
| 5,597,202 A | * 1/1997 | Andersen | ................. 297/195.1 |
| 5,988,739 A | 11/1999 | Dodge et al. | |
| 6,019,423 A | 2/2000 | Dodge et al. | |
| 6,264,279 B1 | 7/2001 | Chow | |

* cited by examiner

Primary Examiner—Peter R. Brown
(74) Attorney, Agent, or Firm—R. William Graham

(57) ABSTRACT

A seat for a vehicle such as a bicycle comprises a clamp for engaging a seat post of the vehicle and a rigid frame supported by the clamp. The preferred rigid frame includes a first and second lateral bar portions; and a cross-bar portion connecting the lateral bar portions. The rigid frame preferably is mounted by parallel bracket plates pivotally supported by the clamp. In accordance with one preferred embodiment, the seat includes a support web which is coupled to the first lateral bar portion near a first edge, to the second lateral bar portion near a second edge, and to the cross-bar near a third edge. In accordance with another preferred embodiment, the seat includes at least one cushion which at least partially surrounds the lateral bar portions. The invention provides a sturdy, comfortable seat which can either be sold as original equipment or retrofit onto an existing vehicle.

25 Claims, 6 Drawing Sheets

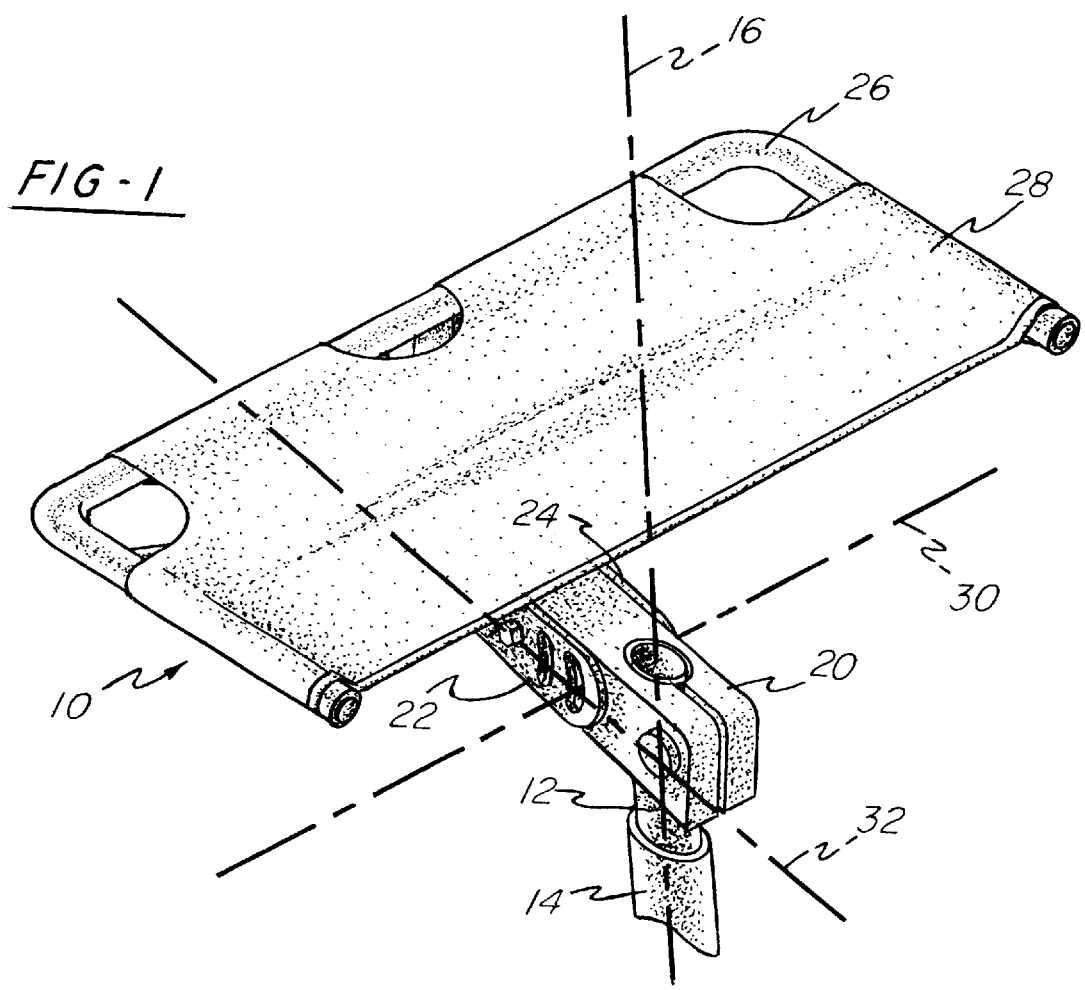

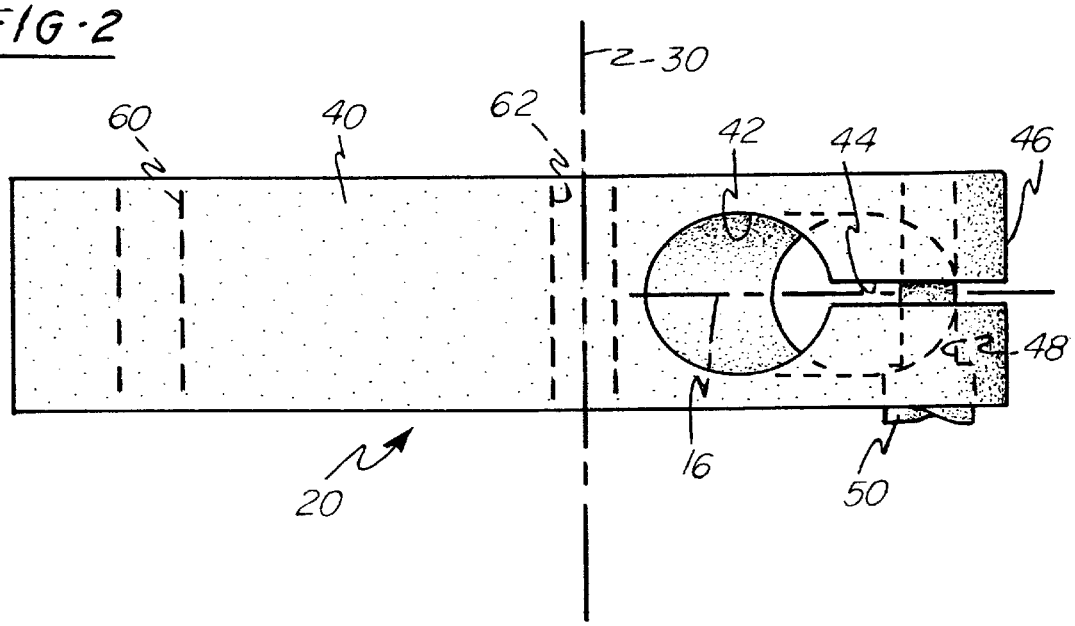
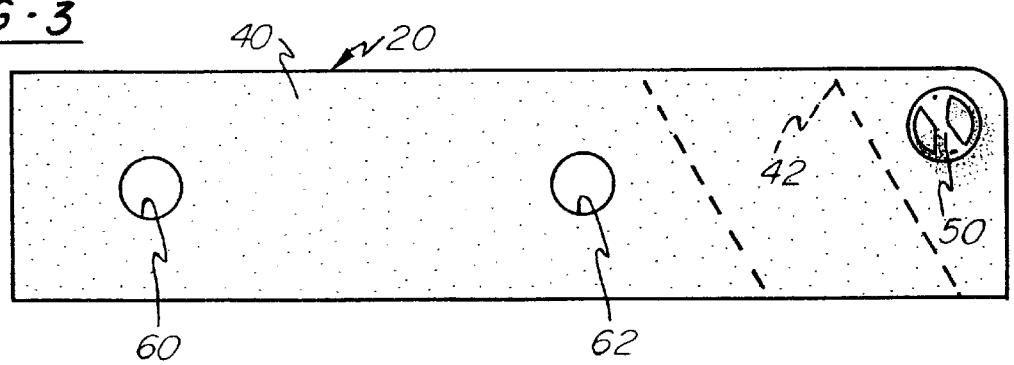

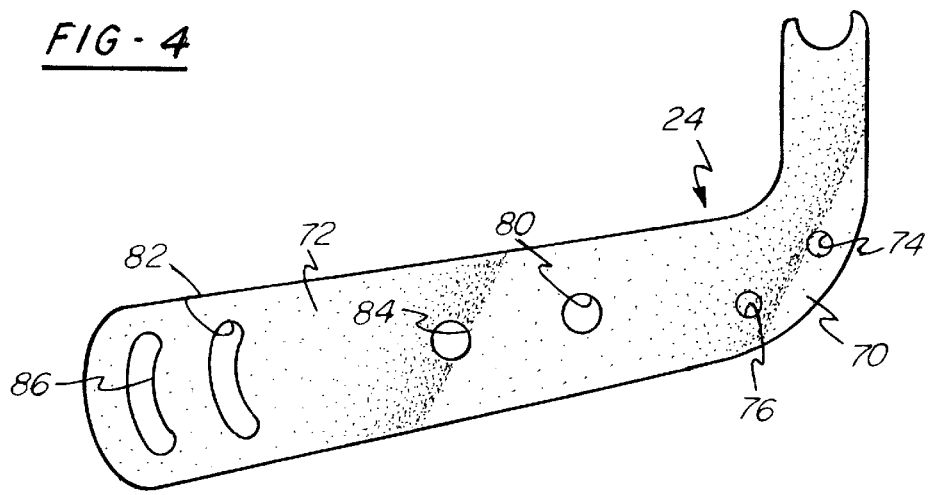
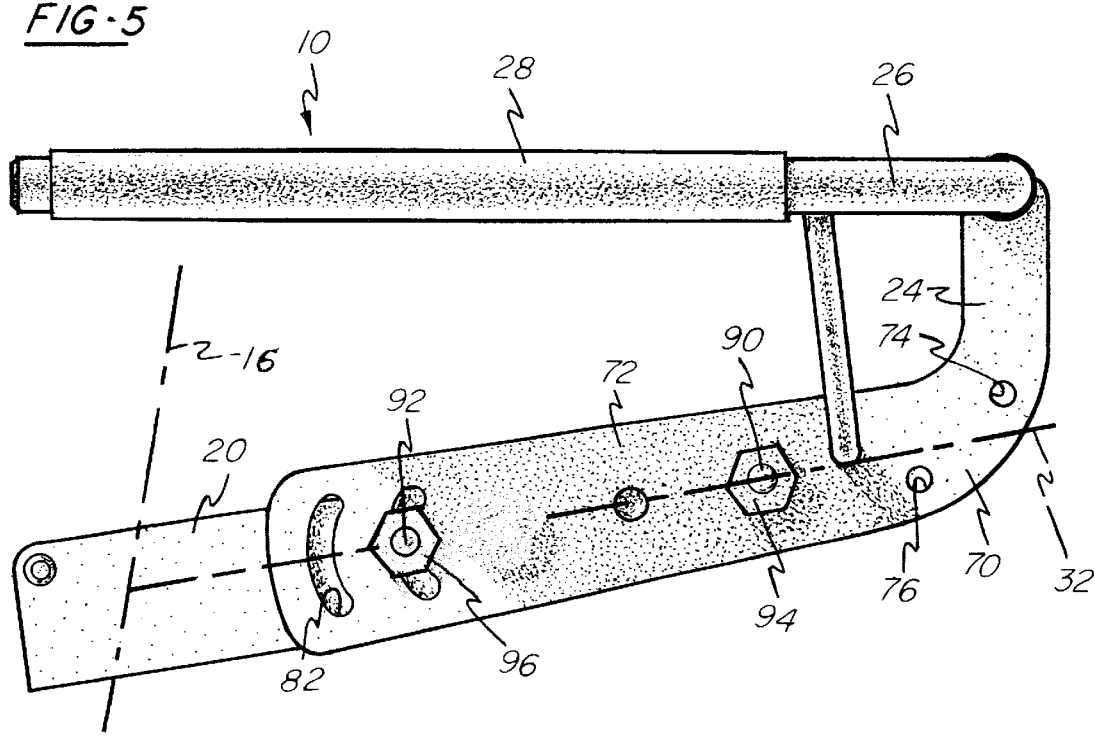

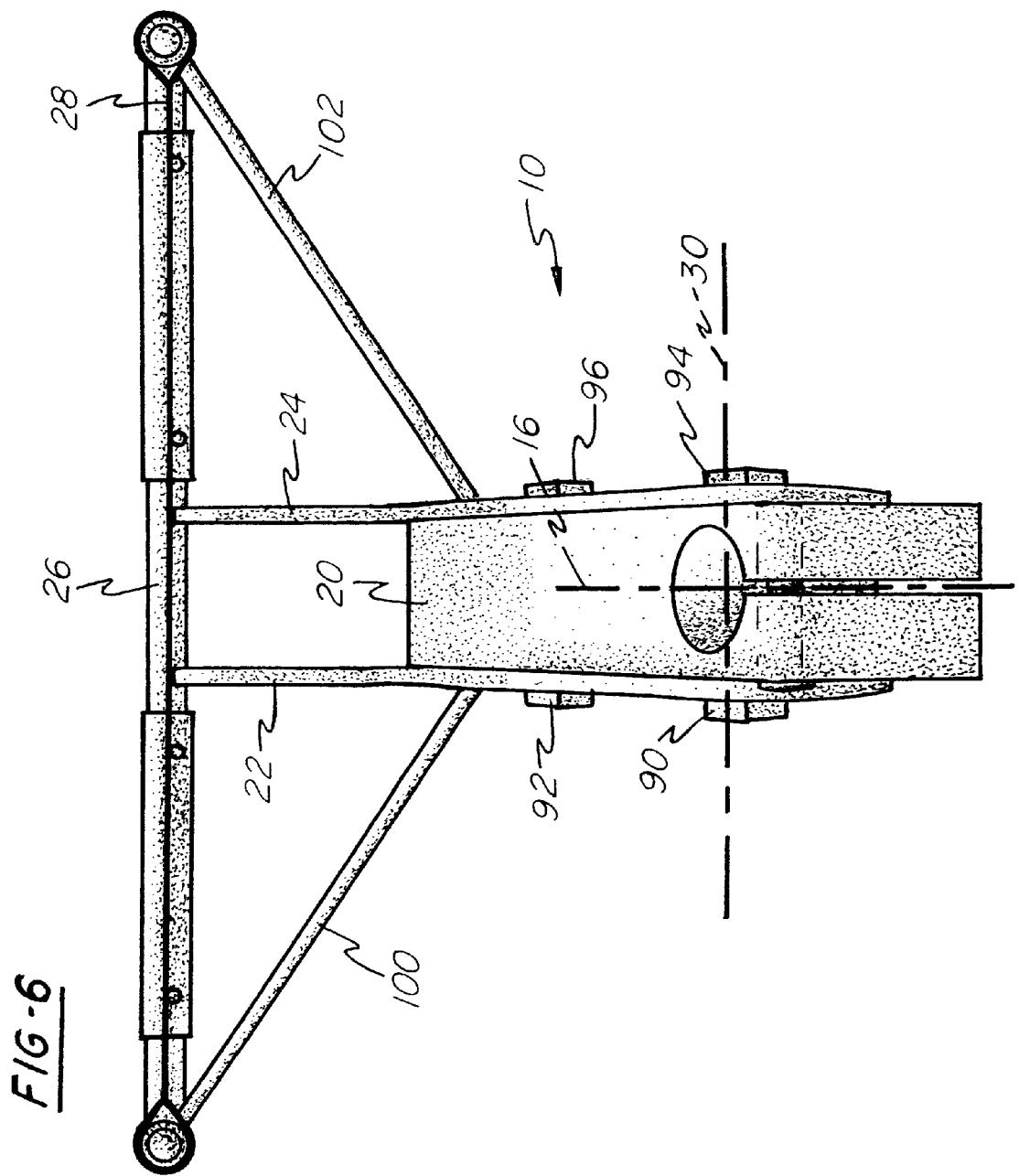

SEAT FOR TWO- OR THREE-WHEELED VEHICLE

BACKGROUND OF THE INVENTION

1. Field of the Invention

The invention relates to a seat for a two-wheeled or three-wheeled vehicle such as a two-wheeled or three-wheeled vehicle. More specifically, the invention relates to a bicycle or tricycle seat having a support web suspended within a rigid metal frame.

2. Description of the Prior Art

Conventional bicycle seats are supported by seat posts which extend upwardly from the seat tubes of the bicycles.

Typically, bicycles are sold with saddle-type rail-based seats which are straddled by the riders' legs while the bicycles are being ridden. Often, such seats are clamped to upper portions of the seat using clamping collars. One drawback to saddle-type seats is discomfort due to selective compression of the rider's pelvic region and abrasion of the rider's thighs.

U.S. Pat. No. 3,874,730 to Marchello proposes a bicycle seat of hammock-like shape. The seat includes a seat frame, preferably formed of straight tubing having opposite ends which are bent upwardly to form legs connected by a straight base. Secured centrally of the base, as by welding, is a mounting stub shaft of sufficient length to be inserted within a conventional bicycle frame seat shaft socket and to be fastened therein and held against movement by a conventional clamping collar. The free ends of the legs are provided with slots which receive ring portions of eye-bolts. These ring portions are received around reduced center bearing portions of cross-pins fastened in place in a rivet-like fashion through aligned holes formed in the legs.

The eye-bolts appear to support a seating strip. More specifically, the eye-bolts are freely journalled through central openings in enlarged central portions of cross bars. The seating strip is preferably formed of a pair of elongated, flexible, stretch-resistant web belts. Opposite ends of the two belts are folded or looped over and fastened by stitches to form opposite end loops which receive opposite free ends of the cross bars. Alternatively, the seating strip may be formed of a single strip of webbing-like material having opposite ends which are similarly looped to receive both of the opposite free ends of the cross bars.

Marchello teaches that his proposal produces a seat more comfortable than conventional saddle-type seats. More specifically, the reference teaches that conventional saddle-type seats are relatively uncomfortable and tend to abrade the legs of the rider during movement of the legs. Marchello claims that the seating strip moves with a rider's body to substantially eliminate relative motion between the seat and the rider's body, thereby eliminating uncomfortable friction and abrasion.

One drawback to the bicycle seat proposed in Marchello is that it likely would provide only limited support to a rider. Since the flexible strips are relatively narrow (on the order of two inches, that is, 5 cm), it is suspected that Marchello's seat would provide direct support for only a small portion of the rider's buttocks. In addition, Marchello's FIG. 1 suggests that the flexible strips or webbing-like material would pivot about a horizontal axis when a rider is seated. This suggests that at least a portion of the vertical support provided by Marchello's seat would be provided by friction between the rider and the flexible strips or webbing-like material. In particular, it is anticipated that a rider would slide or swing within the seat as the rider pedals the bicycle. Marchello's seat does not appear to be adjustable to accommodate riders of different height or build.

Another drawback to the seat proposed in Marchello is lack of sturdiness. In particular, it would likely be difficult to suspend the flexible strips or webbing-like material tautly between the legs of the seat frame.

With continuing reference to FIG. 7, the frame 26 includes a first lateral bar portion 110, a second lateral bar 112 and a cross-bar portion 114. The first and second lateral bar portions 110, 112 are connected to opposite ends of the cross-bar portion 114 by elbow portions 116 and 118 such that the first and second lateral bar portions 110, 112 extend in substantially parallel directions transverse (most preferably, perpendicular) to the length of the cross-bar 114. The bracket plates 22, 24 are preferably affixed to the cross-bar portion 114 so as to balance the weight of the rigid frame 26 relative to the bracket plates 22, 24.

Chow's FIG. 6 proposes a variable thickness molded rubber sling seat including a cushion consisting of a one-piece molded rubber form having a front edge and a U-shaped channel positioned about its remaining periphery. A series of notches are present along the rear of the periphery to enhance the flexibility of the cushion. A cylindrical frame formed from a pair of tubular sections coupled together at a binge is sized to fit within the channel in the cushion. When the cushion arm is suspended from the frame in a suitable structure such as a wheelchair, the cushion deflects to conform to the shape of the body seated in it, as the rubber flexes in tension, accommodating the curvature of the body and minimizing the pressure by distributing the resultant forces evenly.

Chow teaches the use of such seats on wheelchairs. The reference does not appear to address seats susceptible of mounting on seat posts for use on bicycles or the like.

There remains a need in the art for a sturdy, comfortable seat susceptible of mounting on a seat post for use on a bicycle or the like. In addition, there remains a need in the art for a seat which can be adjusted to accommodate riders of different height and build.

SUMMARY OF THE INVENTION

These needs and others are addressed by means of a seat for a wheeled vehicle having a seat post comprising a clamp for engaging the seat post and a rigid frame supported by the clamp. Most preferably, the rigid frame includes a first lateral bar portion, a second lateral bar portion, and a cross-bar portion connecting the first and second lateral bar portions.

In accordance with one especially preferred embodiment, the seat includes a support web suspended from the rigid frame. The preferred support web sheet defines a first edge, a second edge and a third edge intermediate the first and second edges. The support web preferably comprises a flaccid sheet but might also comprise, for example but not by way of limitation, a solid material or a pliant cushion encapsulated in a flaccid sheet. The support web is coupled to the first lateral bar portion near the first edge, to the second lateral bar portion near the second edge, and to the cross-bar near the third edge.

Most preferably, the support web is a flaccid sheet secured to the rigid frame by means of loops which embrace the bar portions of the rigid frame so as to provide a high degree of tautness and sturdiness. More specifically, the preferred flaccid sheet defines a first loop near the first edge which embraces the first lateral bar portion, a second loop near the second edge which embraces the second lateral bar portion and a third loop near the third edge which embraces the cross-bar portion. In accordance with an especially preferred embodiment, the support web has a free edge opposite to, and parallel with, the third edge.

In accordance with another especially preferred embodiment, the seat includes at least one resilient cushion at least partially surrounds the first and second lateral bars of the rigid frame. Most preferably, this structure comprises a first resilient tube substantially surrounding the first lateral bar and a second resilient tube substantially surrounding the second lateral bar. The preferred cushions or tubes include a foamed polymeric material such as foamed rubber.

The rider preferably sits in an orientation in which the rider's legs extend past the lateral bar portions of the rigid frame. By means of this arrangement, the rigid frame provides vertical support for the rider while evenly distributing the supporting forces so as to avoid undue pressure on sensitive portions of the rider's pelvic region. The cross-bar provides support behind the rider's buttocks when the bicycle is accelerated.

The rigid frame preferably is supported by a bracket mounted on the clamp. More specifically, the preferred clamp includes a block having a through-hole, a split extending from a free surface of the block into communication with the through-hole, a threaded socket extending through the split and a set screw engaging said threaded socket for securing the clamp onto the seat post of the wheeled vehicle. The preferred bracket comprises a pair of parallel bracket plates extending from the cross-bar, each bracket plate including an elbow and an arm portion configured such that the arm portions of the bracket surround the clamp. Most preferably, the seat includes a pair of tie rods extending from the pair of parallel bracket plates toward the first and second lateral bar portions so as to provide azimuthal support to the rigid frame.

The preferred bracket is pivotally mounted on the clamp so as to permit the adjustment of the seat to accommodate riders of different height and build. More specifically, each arm portion of the bracket has at least a first hole and a second hole spaced from the first hole along the length of the arm portion. The preferred second hole has a length along a direction transverse to the length of the arm portion which is greater than a maximum length of the first hole along the same direction. The preferred clamp includes a first journal extending through the block making up the clamp in alignment with the first hole in each of the bracket plates and a second journal extending through the block in alignment with the second hole in each of the bracket plates. A first threaded pin extends through the first journal and through first hole in each leg portion. A second threaded pin extends through the second journal and through the second hole in each leg portion.

The preferred bracket can be secured so as to retain it in a desired orientation. More specifically, one or more nuts engage at least one of the first and second threaded pins. This permits the rider to tilt the bracket and the rigid frame relative to an axis of the seat post and then to tighten the bolts to lock the rigid frame into an orientation which provides maximum comfort to the rider. Most preferably, the arm portions of the bracket plates include additional sets of holes having cross-section substantially the same as those of the first and second holes so as to permit the rider to move the rigid frame forwardly or backwardly relative to the seat post so as to accommodate riders of different heights and builds.

Therefore, one object of the invention is to provide a sturdy, comfortable seat for a two- or three-wheeled vehicle such as a bicycle. The invention will be further described in conjunction with the appended drawings and following detailed description.

BRIEF DESCRIPTION OF THE DRAWINGS

FIG. 1 is a perspective view of a first embodiment of a seat in accordance with the invention;

FIG. 2 is a top plan view of a clamp for the seat of FIG. 1;

FIG. 3 is a side elevational view of the clamp of FIG. 2;

FIG. 4 is a side elevational view of a bracket plate for the seat of FIG.

FIG. 5 is a side elevational view of the seat of FIG. 1;

FIG. 6 is a rear elevational view of the seat of FIG. 1;

DETAILED DESCRIPTION OF THE PREFERRED EMBODIMENT

Figure 7:
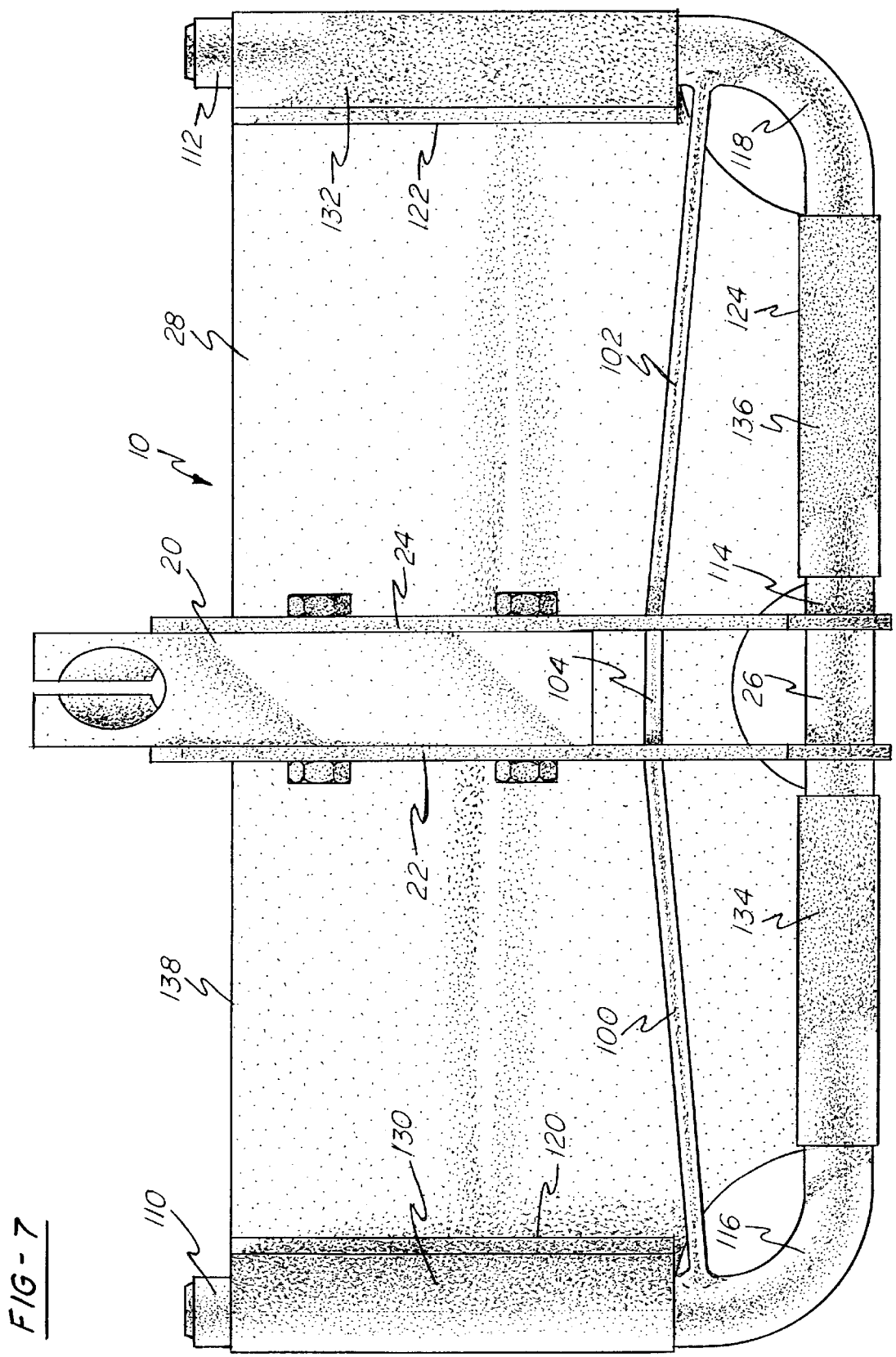
FIG. 7 is a bottom plan view of the seat of FIG. 1.

FIG. 1 shows a first embodiment of a seat 10 designed for mounting on a seat post 12 of a two- or three-wheeled vehicle such as a bicycle (not shown). The seat post 12 is supported by a seat tube 14 of the bicycle (not shown). To provide a frame of reference, it will be noted that conventional bicycle seat posts and seat tubes are cylindrical in shape and, thus, the seat post 12 defines a seat post axis 16 extending centrally along the length of the seat post 12.

The seat 10 includes a clamp 20; a bracket comprising a pair of parallel bracket plates 22 and 24; a rigid frame 26; and a flaccid sheet 28. The preferred clamp 20 is elongated and defines a pivot axis 30 transverse (that is, perpendicular or oblique) to the seat post axis 16. The bracket plates 22, 24 together define a pivot arm direction 32 which is transverse to both the seat post axis 16 and the pivot axis 30.

As shown in FIG. 2, the preferred clamp 20 includes a substantially prismatic block 40; a through-hole 42 extending along the seat post axis 16 for receiving the seat post 12 (FIG. 1); a split 44 extending from a free surface 46 of the block 40 into communication with the through-hole 42; a threaded socket 48 extending through the split 44; and a set screw 50 engaging the threaded socket 48. Tightening the set screw 50 compresses the through-hole 42 so as to allow the through-hole 42 to grasp the seat post 12 (FIG. 1). As shown in FIG. 3, the preferred clamp 20 also includes a first journal 60 which extends through the block 40; and a second journal 62 which extends through the block 40 and which is spaced from the first journal 60. As shown in FIG. 2, the first and second journals 60, 62 each extend along a direction parallel to the pivot axis 30. The configuration of the preferred clamp 20 is not critical to the invention and other alternatives configurations will be apparent to those of ordinary skill in the art without departing from the scope and spirit of the invention.

As shown in FIG. 4, each of the preferred bracket plates 22 (FIG. 1), 24 includes an elbow portion 70 and an arm portion 72 extending from the elbow portion 70. As shown in FIG. 5, the preferred elbow portion 70 is affixed, as by welding, to the rigid frame 26 while the preferred arm portion 72 extends away from the rigid frame 26 along the pivot arm direction 32. In accordance with an especially preferred embodiment, the elbow portion 70 includes one or more mounting holes 74, 76 (two shown in FIG. 4) for mounting or suspending equipment from the front of the seat 10 (FIG. 1).

Returning to FIG. 4, the preferred arm portions 72 (only one shown) each include a first hole 80 and a second hole 82. In accordance with an especially preferred embodiment, the first hole 80 has a circular cross-section while the second hole 82 has a cross-section of a shape formed by extruding a circle (not shown) along a circular arc (not shown). As will be apparent from FIGS. 4 and 5, the preferred second hole 80 has a length along a direction parallel to the seat post axis 16 (FIGS. 1 and 2) greater than a maximum length of the hole 82 along the same direction.

With continuing reference to FIG. 4, the preferred arm portions 72 (only one shown) each include a third hole 84 and a fourth hole 86. In accordance with an especially preferred embodiment, the third hole has a circular cross-section substantially identical to that of the first hole 80 while the fourth hole 86 has an elongated cross-section substantially identical to that of the second hole 82. As will be apparent from FIGS. 4 and 5, the spacing between the third hole 84 and the first hole 80 along the pivot arm direction 32 is substantially the same as the spacing between the fourth hole 86 and the second hole 82 along the same direction.

As shown in FIGS. 5, a first threaded pin 90 extends through the first hole 80 (FIG. 4) while a second threaded pin 92 extends through the second hole 82. Nuts 94 and 96 engage the first and second threaded pins 90, 92. The first and second threaded pins 90, 92 are demountable in the sense that, once the nuts 94 and 96 are disengaged from the first and second threaded pins 90, 92, the first and second threaded pins 90, 92 can be slid out of the first and second holes 80 (FIG. 4), 82 and removed from the seat 10.

As shown in FIG. 6, the first and second threaded pins 90, 92 preferably extend along a direction parallel to the pivot axis 30 so as to permit the pair of parallel bracket plates 22, 24 and the rigid frame 26 to pivot or tilt about the pivot axis 30. More specifically, the first and second journals 60, 62 (FIGS. 2 and 3) through the preferred clamp 20 preferably are spaced so as to align with the first and second holes 80, 82 (FIGS. 4 and 5) in the preferred bracket plates 22, 24. The first and second threaded pins 90, 92 extend through the first and second journals 60, 62 (FIGS. 2 and 3) as well as through the first and second holes 80, 82 (FIGS. 4 and 5). The first threaded pin 90 supports the bracket plates 22, 24 and the rigid frame 26 for pivotal movement about the first threaded pin 90 when the nuts 94, 96 are loosened. The second hole 82 (FIGS. 4 and 5) limits the range of pivotal movement of the bracket plates 22, 24.

With continuing reference to FIG. 6, a pair of tie rods 100 and 102 preferably extend the bracket plates 22, 24 toward the rigid frame 26 to provide azimuthal support for the rigid frame 26. In addition, as shown in FIG. 7, a central tie rod 104 preferably extends between the bracket plates 22, 24 to space and support the bracket plates 22, 24.

With continuing reference to FIG. 7, the rigid frame 26 includes a first lateral bar portion 110, a second lateral bar portion 112 and a cross-bar portion 114. The first and second lateral bar portions 110, 112 are connected to opposite ends of the cross-bar portion 114 by elbow portions 116 and 118 such that the first and second lateral bar portions 110, 112 extend in substantially parallel directions transverse (most preferably, perpendicular) to the length of the cross-bar 114 the bracket plates 22, 24 are preferably affixed to the cross-bar portion 114 so as to balance the weight of the rigid frame 26 relative to the bracket plates 22, 24.

The flaccid sheet 28 preferably is supported near three of its edges by the rigid frame 26. More specifically, the flaccid sheet 28 defines a first edge 120, a second edge 122 and a third edge 124 intermediate the first and second edges 120, 122. The flaccid sheet further includes a first loop 130 near the first edge 120; a second loop 132 near the second edge 122; a third loop 134 near the third edge 124; and a fourth loop 136, also near the third edge 124. In accordance with an especially preferred embodiment, the first loop 130 embraces the first lateral bar portion 110; the second loop 132 embraces the second lateral bar portion 112; and the third and fourth loops 134, 136 embrace the cross-bar portion 114 on opposite sides of the bracket plates 22, 24. The preferred flaccid sheet 28 additionally defines a free end 138 unsupported by the rigid frame 26. In accordance with an especially preferred embodiment, the flaccid sheet 28, bears visual indicia (not shown) such as a suitable trademark or designator, either on one of the first, second, third and fourth loops 130, 132, 134, 136; or in the section suspended between the first and second lateral bar portions 110, 112 and the cross-bar 114.

With reference to FIGS. 1, 6 and 7, the preferred seat 10 is mounted on a bicycle (not shown) or the like by sliding the seat post 12 (FIG. 1) of the bicycle into the through-hole 42 (FIGS. 6 and 7) of the clamp 20 and tightening the set screw 50 (FIG. 6) to compress the sides of the through-hole 42 against the seat post 12. A rider (not shown) preferably sits on the flaccid sheet 28 in such an orientation that the rider's legs (not shown) extend over the free end 138 (FIG. 7) of the flaccid sheet 28. Thus, the flaccid sheet 28 provides vertical support for the rider (not shown) while evenly distributing the forces supporting the rider so as to avoid undue pressure on sensitive portions of the rider's pelvic region. The cross-bar portion 114 (FIG. 7) provides support behind the rider's buttocks when the bicycle (not shown) is accelerated. Since the rider (not shown) does not straddle the seat 10, the rider's thigh region is not abraded by contact with the seat 10.

The seat 10 is adjustable to accommodate riders (not shown) of different height and build. As noted earlier, the bracket plates 22, 24 and the rigid frame 26 are mounted by the first pin 90 (FIGS. 6 and 7) for pivotal movement about the pivot axis 30. Most preferably, the pivot axis 30 corresponds approximately to a horizontal axis perpendicular to the length of the bicycle (not shown) or the like. This allows a rider (not shown) to tilt the flaccid sheet 28 toward or away from the handle bars (not shown) and pedals (not shown) of the bicycle for maximum comfort. The bracket plates 22, 24 and the rigid frame 26 can be locked in a preferred tilt angle by tightening the nuts 94, 96 (FIGS. 6 and 7) on the first and second threaded pins 90, 92 (FIGS. 6 and 7).

In addition, with particular reference to FIGS. 5 and 6, the rider (not shown) may remove the first and second threaded pins 90, 92 (FIG. 6) from the first and second holes 80 (FIG. 5), 82 (FIGS. 5 and 6), shift the clamp 20 (FIG. 6) along the pivot arm direction 32 (FIG. 5); and reinsert the first and second threaded pins 90, 92 (FIG. 6) in the third and fourth holes 84, 86 (FIG. 5). This shifts the bracket plates 22, 24 (FIG. 6), the rigid frame 26 (FIG. 6) and the flaccid sheet 28 (FIG. 6) along the pivot arm direction 32 (FIG. 5) so as to provide more or less space between the seat 10 and the handle bars (not shown) of the bicycle (not shown).

With reference to FIGS. 6 and 7, the preferred clamp 20; the preferred bracket plate 22, 24; the preferred rigid frame 26; and the preferred tie rods 100, 102, 104 are preferably composed of a metal such as steel and affixed together, where appropriate, by welding or the like. The flaccid sheet 28 is preferably formed of an inelastic textile material such as CORDURA nylon material, available from E.I. duPont de Nemours and Company of Wilmington, Del. Alternatively, it is possible to construct the support web which supports the rider from other flaccid materials (not shown); from a solid material such as wood (not shown); from a solid material encapsulated in a flaccid material (not shown); or from a pliant cushion material encapsulated in a flaccid material (not shown). Other alternatives will be apparent to those of ordinary skill in the art without departing from the scope and spirit of the invention.

The flaccid sheet 28 preferably is cut to shape and then fitted over the rigid frame 26. Most preferably, the flaccid sheet 28 is positioned relative to the rigid frame 26 and wrapped about the first lateral bar portion 110, the second lateral bar portion 112 and the cross-bar portion 114. The first, second and third edges 120, 122 and 124 are secured to the body of the flaccid sheet 28 by riveting, stitching or the like to form the first, second, third and fourth loops 130, 132, 134, 136. This method allows the flaccid sheet 28 to be stretched tautly over the rigid frame 26 and provides a sturdy construction for the seat 10 as a whole.

Figure 8:
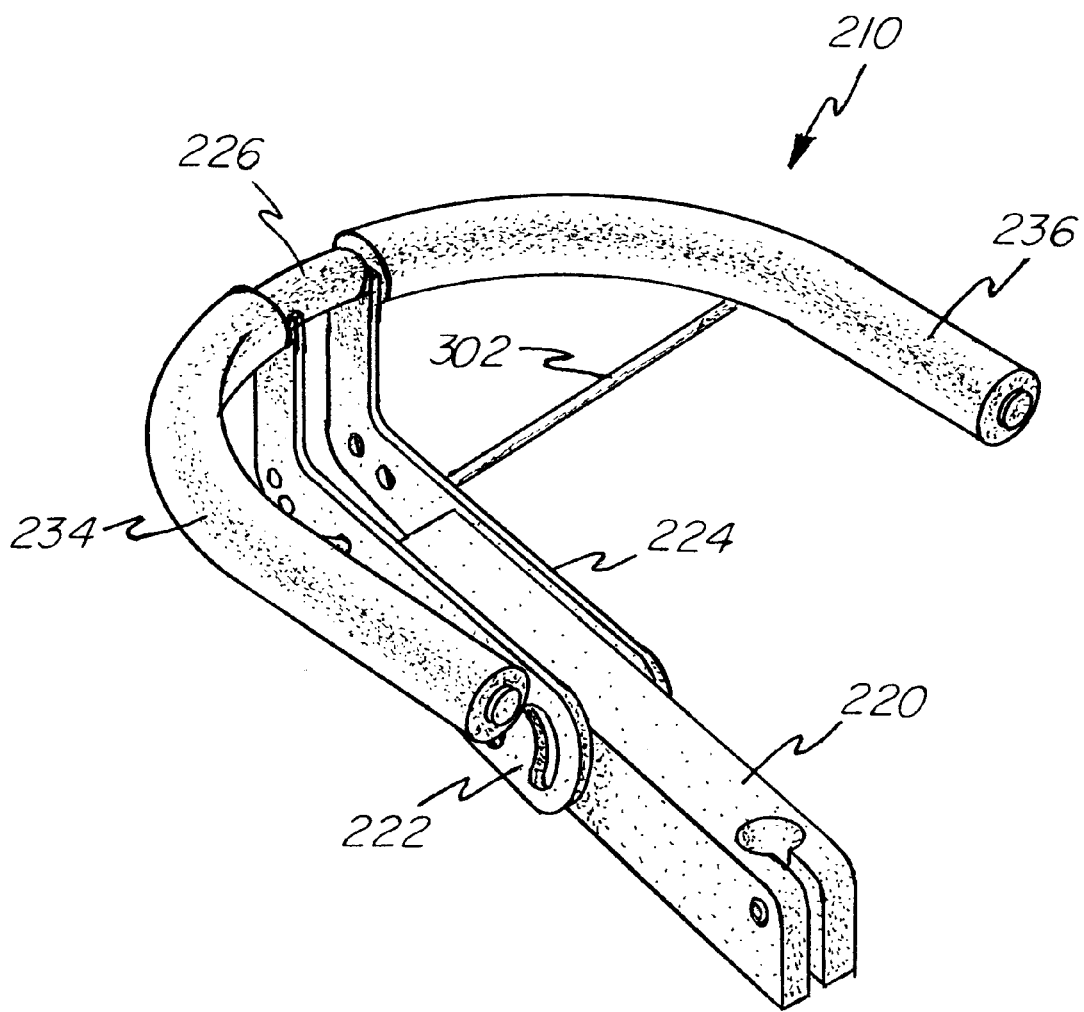
FIG. 8 is a perspective view of a second embodiment of a seat in accordance with the invention.

FIG. 8 shows a second embodiment of a seat 210 in accordance with the invention. The seat 210 includes a clamp 220; a bracket comprising a pair of parallel bracket plates 222 and 224; and a rigid frame 226. The clamp 220; the bracket plates 222, 224; and the rigid frame 226 are substantially identical in construction to the clamp 20; the bracket plates 22, 24; and the rigid frame 26 of the embodiment of FIG. 1. The seat 210 further includes at least one resilient cushion in the form of a first resilient tube 234 substantially surrounding a first lateral bar portion 310 of the rigid frame 226 and a second resilient tube 236 at substantially surrounding a second lateral bar portion 312 of the rigid frame 226. The preferred first and second resilient tubes 234, 236 preferably consist of foamed polymeric material such as foamed rubber (not shown) surrounded by a flexible sleeve or coating (not shown). Most preferably, the first and second resilient tubes 234, 236 are adapted to fit around tie bars 302 (only one shown in FIG. 8) connecting the bracket plates 222, 224 to the rigid frame 226, such as by slitting the first and second resilient tubes 234, 236 along their lengths so as to fit over the tie rods 302.

Thus, the invention provides a comfortable, sturdy seat for a two- or three-wheeled vehicle such as a bicycle. The seat 10 can either be sold as original equipment or retrofit onto an existing bicycle or the like (not shown). Although this invention has been described in conjunction with certain specific forms and modifications thereof, it will be appreciated that a wide variety of other modifications can be made without departing from the spirit and scope of the invention.

What is claimed is:

1. A seat for a wheeled vehicle having a seat post comprising:
   a clamp for engaging the seat post along a seat post axis; a bracket coupled to said clamp for pivotal movement about a pivot axis transverse to said set post axis; a rigid frame including a first lateral bar portion, a second lateral bar portion, and a cross-bar portion connecting said first and second lateral bar portions sad cross-bar being supported by said bracket, wherein said bracket comprises a pair of parallel bracket plates extending from said cross-bar along a pivot arm direction transverse to said seat post axis, said pair of parallel bracket plates surrounding said clamp; wherein each bracket plate of said pair of parallel bracket plates defines at least a pair of holes of substantially identical cross-section spaced along said pivot am direction; and wherein a demountable pin extends through one hole of said pair of holes in each said bracket of said pair of parallel bracket plates and through said clamp along a pivot axis transverse to both said seat post axis and said pivot arm direction.

2. The seat as recited in claim 1 wherein said first and second lateral bar portions are substantially parallel.

3. The seat as recited in claim 1 further comprising a support web defining a first edge, a second edge and a third edge intermediate said first and second edges, said support web being coupled to said first lateral bar portion near said first edge, said support web being coupled to said second lateral bar portion near said second edge, and said support web being coupled to said cross-bar near said third edge.

4. The seat as recited in claim 3 wherein said support web is a flaccid sheet including a first loop near said first edge embracing said first lateral bar portion; and a second loop near said second edge embracing said second lateral bar portion.

5. The seat as recited in claim 3 wherein said support web is a flaccid sheet including a first loop near said first edge embracing stud first lateral bar portion; a second loop near said second edge embracing said second lateral bar portion; and a third loop near said third edge embracing said cross-bar portion.

6. The seat as recited in claim 3 wherein said support web has a free edge opposite said third edge.

7. The seat as recited in claim 3 wherein said support web has a free edge parallel to said third edge; and said first and second edges are substantially parallel.

8. The seat as recited in claim 1 further comprising at least one resilient cushion, wherein said at least one resilient cushion at least partially surrounds said first lateral bar portion and said second lateral bar portion.

9. The seat as recited in claim 8 wherein said at least one resilient cushion includes a first resilient tube substantially surrounding said first lateral bar portion and a second resilient tube substantially surrounding said second lateral bar portion.

10. The seat as recited in claim 8 wherein said at least one resilient cushion includes a foamed polymeric material.

11. The seat as recited in claim 1, which is further characterized to include a second pin, and each said pair of holes defines at least a first hole and a second hole spaced from said first hole along said pivot arm direction, said second hole having a length along a direction parallel to said seat post axis greater than a maximum length of said first hole along said direction parallel to said seat post axis; wherein said demountable pin extends through said first hole in each said bracket of said pair of parallel bracket plates and through said clamp along a pivot axis transverse to both said seat post axis and said pivot arm direction; and wherein said second pin extends through said second hole in each said bracket of said pair of parallel bracket plates and through said clamp along a pivot axis transverse to both said seat post axis and said pivot arm direction.

12. The seat as recited in claim 11, wherein said pins are threaded and which further includes one or more nuts, wherein said one or more nts engage at least one of said demountable and second threaded pins to regulate pivotal movement of said bracket relative to said clamp about said pivot axis.

13. A seat for a wheeled vehicle having a seat post comprising:
   a bracket for pivotal movement about a pivot axis transverse to said seat post axis; a rigid fame including a first lateral bar portion, a second lateral bar portion, and a cross-bar portion connecting said first and second lateral bar portions said cross-bar being supported by said bracket, wherein said bracket comprises a pair of parallel bracket plates extending from said cross-bar along a pivot arm direction transverse to said seat post axis, and at least one tie rod extending from at least one bracket of said parallel bracket plates toward at least one of said first and second lateral bars.

14. The seat as recited in claim 13, which includes a clamp for engaging the seat post along a seat post axis, wherein said bracket is coupled to said clamp.

15. The seat as recited in claim 13, which includes further comprising a support web defining a first edge, a second edge and a third edge intermediate said first and second edges, said support web being coupled to said first lateral bar portion near said first edge, said support web being coupled to said second lateral bar portion near said second edge, and said support web being coupled to said cross-bar near said third edge.

16. The seat as recited in claim 15, wherein said support web is a flaccid sheet including a first loop near said first edge embracing said first lateral bar portion; and a second loop near said second edge embracing said second lateral bar portion.

17. The seat as recited in claim 15, wherein said support web is a flaccid sheet including a first loop near said first edge embracing said first lateral bar portion; a second loop near said second edge embracing said second lateral bar portion; and a third loop near said third edge embracing said cross-bar portion.

18. The seat as recited in claim 15, wherein said support web has a free edge opposite said third edge.

19. The seat as recited in claim 13, comprising at least one resilient cushion, wherein said at least one resilient cushion at least partially surrounds said first lateral bar portion and said second lateral bar portion.

20. The seat as recited in claim 19, wherein said at least one resilient cushion includes a fist resilient tube substantially surrounding said first lateral bar portion and a second resilient tube substantially surrounding said second lateral bar portion.

21. The seat as recited in claim 19, wherein said at least one resilient cushion includes a foamed polymeric material.

22. A seat for a wheeled vehicle having a seat post comprising:

a clamp including a block having a through-hole extending along a seat post axis, a split extending from a free surface of the block into communication with said through-hole, a threaded socket extending through said split, a set screw engaging said threaded socket, a first journal extending through said block parallel to a pivot axis transverse to said seat post axis, and a second journal extending through said block parallel to said pivot axis, said second journal beings spaced from said first journal;

a pair of parallel bracket plates extending from a cross-bar portion along a pivot arm direction transverse to said seat post axis, each bracket plate of said pair of parallel bracket plates including an elbow portion and an arm portion extending along said pivot arm direction;

each arm portion defining at least a first hole and a second hole spaced from said first hole along a pivot arm direction transverse to said seat post axis and said pivot axis, said second hole having a length along a direction parallel to said seat post axis greater than a maximum length of said fist hole along said direction parallel to said seat post axis;

said pair of parallel bracket plates surrounding said clamp such that said first journal is aligned with said first hole of each said arm portion and said second journal is aligned with said second hole of each said arm portion;

a first threaded pin extending through said first hole in each arm portion and through said first journal;

a second threaded pin extending through said second hole in each said arm portion and through said second journal;

one or more nuts engaging at least one of said first and second threaded pins;

a rigid frame including a first lateral bar portion, a second lateral bar portion, and said cross-bar portion connecting said first and second lateral bar portions, said cross-bar portion being supported by said bracket; and a pair of tie rods extending from said pair of parallel bracket plates toward said first and second lateral bar portions.

23. The seat as recited in claim 22 wherein each arm portion includes a third hole having substantially the same cross-section as said first hole and a fourth hole having substantially the same cross-section as said second hole, said third hole being spaced from said first hole by a distance along said pivot arm direction and said fourth hole being spaced from said second hole by said distance along said pivot arm direction.

24. The seat as recited in claim 22 further comprising a flaccid sheet defining a first edge, a second edge parallel to said first edge, a third edge intermediate said first and second edges, a free edge parallel to said third edge, a first loop near said fist edge embracing said first lateral bar portion, a second loop near said second edge embracing said second lateral bar portion, and a third loop near said third edge embracing said cross-bar portion.

25. The seat as recited in claim 22 further comprising a first resilient tube substantially surrounding said first lateral bar portion; and a second resilient tube substantially surrounding said second lateral bar portion, said first and second resilient tubes including a foamed polymeric material.

* * * * *